(12) United States Patent
Schaefer

(10) Patent No.: US 7,279,658 B2
(45) Date of Patent: Oct. 9, 2007

(54) DEVICE FOR CLEANING THE GAS NOZZLE OF A WELDING TORCH

(75) Inventor: Ralf Schaefer, Wettenberg (DE)

(73) Assignee: Alexander Binzel Schweisstechnik, Buseck (DE)

( * ) Notice: Subject to any disclaimer, the term of this patent is extended or adjusted under 35 U.S.C. 154(b) by 99 days.

(21) Appl. No.: 10/554,144

(22) PCT Filed: Apr. 28, 2004

(86) PCT No.: PCT/EP2004/004472

§ 371 (c)(1),
(2), (4) Date: Oct. 24, 2005

(87) PCT Pub. No.: WO2004/096477

PCT Pub. Date: Nov. 11, 2004

(65) Prior Publication Data

US 2006/0249498 A1    Nov. 9, 2006

(30) Foreign Application Priority Data

Apr. 28, 2003   (DE) ............................... 103 19 261

(51) Int. Cl.
*B23K 9/32* (2006.01)
(52) U.S. Cl. .................................... 219/136
(58) Field of Classification Search ............. 219/136, 219/125.1, 137.2, 137.43
See application file for complete search history.

(56) References Cited

U.S. PATENT DOCUMENTS

| 4,702,195 A * | 10/1987 | Thielmann .................. 219/136 |
| 4,733,050 A | 3/1988 | Grafius ..................... 219/125.1 |
| 4,778,976 A | 10/1988 | Litt et al. .................... 219/136 |
| 4,834,280 A * | 5/1989 | Thielmann ............... 219/137.2 |
| 5,138,969 A * | 8/1992 | Thielmann ............... 219/137.2 |
| 7,053,335 B2 * | 5/2006 | Von Der Ohe .............. 219/136 |

FOREIGN PATENT DOCUMENTS

| DE | 8417822.1 | 10/1984 |
| DE | 8417838.8 | 4/1986 |
| DE | 8707787.6 | 7/1987 |
| DE | 8810483.4 | 10/1988 |
| DE | 9016112.2 | 3/1991 |
| EP | 90233 A * | 10/1983 |
| EP | 694360 B1 * | 9/1997 |
| JP | 3193272 | 8/1991 |
| JP | 7-314142 A * | 12/1995 |

* cited by examiner

Primary Examiner—Clifford C. Shaw
(74) Attorney, Agent, or Firm—Charles P. Boukus, Jr.

(57) ABSTRACT

The invention relates to a device (10) for cleaning the gas nozzle (12) of a welding torch (14) and for spraying the gas nozzle (12) or a welding wire located in the gas nozzle (12). The inventive device comprises a clamping/holding device (16) for the gas nozzle (12), a cleaning device (18) for mechanically removing welding residues from the gas nozzle (12), wherein the cleaning device (18) can be moved in the direction of a first axis (20) towards the clamping/holding device (16) or away from the latter. The device also comprises a spraying device (22) for applying an anti-stick medium. The spraying device (22) can be moved in the direction of a second axis (24) that is arranged in a substantially transversal manner with respect to a first axis (20) and relative to the clamping/holding device (16). Preferably, the spraying device (22) is mechanically coupled to a cutting device (44) for the welding wire.

20 Claims, 2 Drawing Sheets

DEVICE FOR CLEANING THE GAS NOZZLE OF A WELDING TORCH

Figure 1:
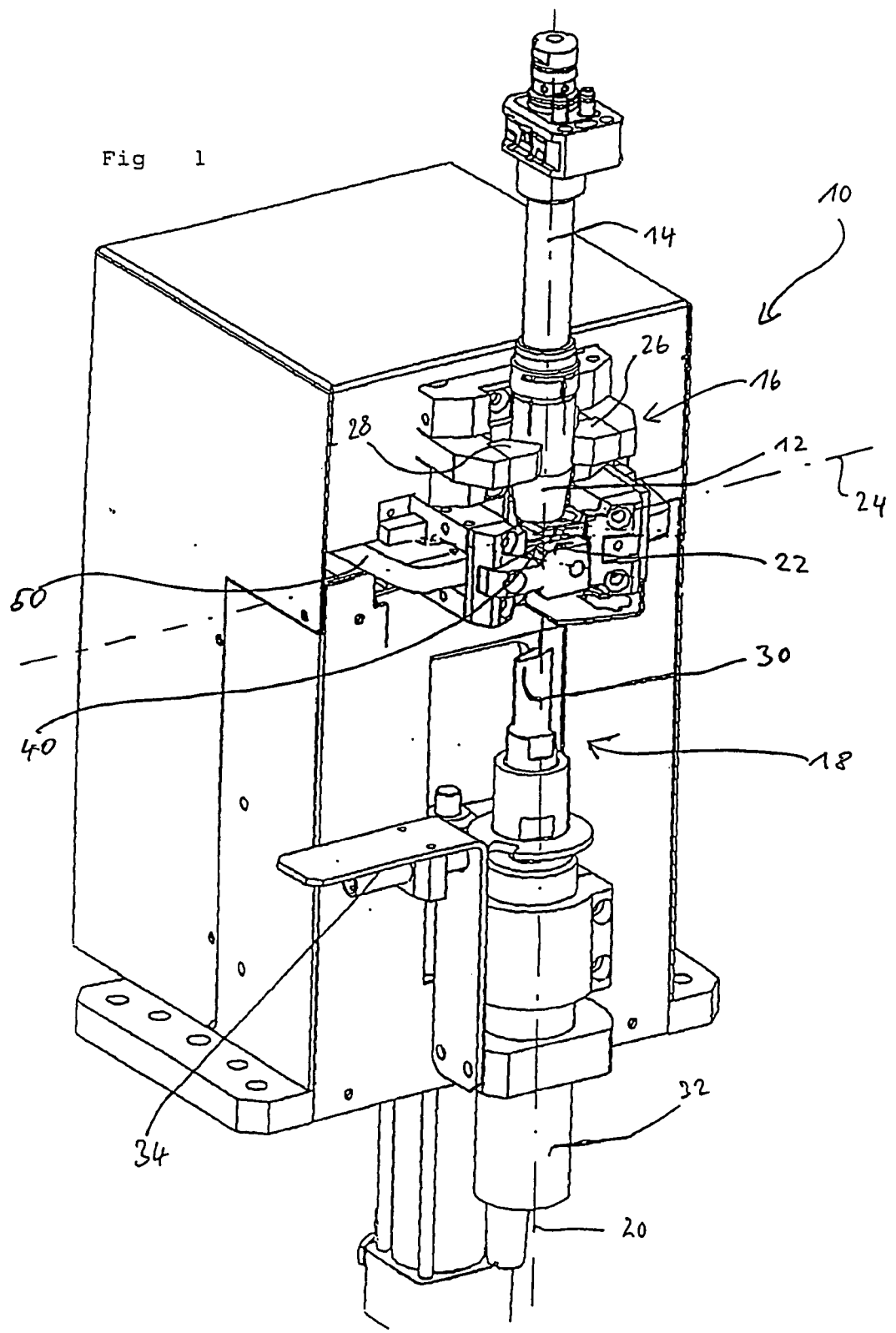

The invention relates to a device for cleaning a gas nozzle of a welding torch and for spraying the gas nozzle or a welding wire located in the gas nozzle, having a clamping/holding device for the gas nozzle, having a cleaning device for mechanically removing welding residues from the gas nozzle, the cleaning device being movable in the direction of a first axis toward and away from the clamping/holding device, and having a spraying device for applying an anti-stick medium or other fluid medium.

In welding, the welding wire is guided through the gas nozzle that acts to deliver gas, and typically the welding wire is brought toward the welding point with the aid of a so-called handling device or a robot arm. In the welding operation itself, the welding material sprays, and contaminants in the gas nozzle are deposited, which gradually close the gas nozzle and impede the delivery of gas. It is therefore necessary to clean the gas nozzle fairly often.

From German Utility Model DE 87 07 787 U1, a cleaning device with the characteristics recited at the outset is already known. The device described there for cleaning the gas nozzle of a welding torch has rotating knives introduced into the nozzle in a centered manner. The gas nozzle is moved into the cleaning device and centered and locked and cleaned by the rotating knives. After the cleaning of the gas nozzle, the gas nozzle is sprayed with an anti-stick medium or the like by means of a spraying device. Next, the locking device or clamping/holding device is released, and the nozzle is removed from the cleaning device for further use. The spraying device is embodied in the form of two spray nozzles, located in stationary fashion laterally of the gas nozzle, which are actuated after the termination of the cleaning operation by the cleaning device and the lowering of the cleaning device and spray or feed an anti-stick medium into the gas nozzle.

In this known cleaning device, it proves disadvantageous that a large proportion of the anti-stick medium does not get into the gas nozzle, and that care is not taken for uniform moistening of the interior of the gas nozzle or of the welding wire located there. This unfavorable arrangement, or stationary positioning, of the spray nozzles in the known cleaning device may also be ascribed to the fact that the cleaning device additionally has a cutting device, which cuts the welding wire that protrudes into the gas nozzle or out of the tip of the gas nozzle. The cutting device has a fixed knife, which is located directly below the opening in the gas nozzle. Associated with this fixed upper knife is a pivotable lower knife, with which the welding wire can be cut off.

A further device for cleaning a gas nozzle of a welding torch is known from German Utility Model DE 84 17 838 U1. This device again has revolving knives, which scratch off contaminants that have become deposited in the gas nozzle. After that, the gas nozzle is sprayed with an anti-stick medium. For this purpose, the cleaning device has a nozzle receptacle, comprising two stops and a piston that presses the gas nozzle against the stops. Axially fixable knives and obliquely positioned stationary spray nozzles for an anti-stick medium are provided below the receptacle for the gas nozzle.

This cleaning device has the same disadvantages already addressed above.

A further cleaning device for the gas nozzle of a welding torch is known from German Utility Model DE 90 16 112 U1. This cleaning device has a motor-driven, revolving knife which is introduced into the gas nozzle and, after scratching deposits off the gas nozzle, is moved out of it again. For spraying the gas nozzle with an anti-stick medium or other fluid, it is provided that the handle of the knife, or the knife receptacle, has conduits for delivering the anti-stick medium. These provisions prove to be technically extremely complicated and expensive, since the anti-stick medium must be fed by a shaft rotating at high speed, namely the drive shaft of the knives. Hence complicated seals and the like must be provided. Moreover, the knives screen off at least part of the stream of anti-stick medium emerging from the nozzle, so that even with this complex arrangement, a uniform application of anti-stick medium to the gas nozzle is not assured.

Finally, U.S. Pat. No. 4,778,976 discloses a cleaning device in which the anti-stick medium is sprayed into the gas nozzle through a spray nozzle located immediately below the gas nozzle. However, this gas nozzle is not freed of welding residues by means of a rotating knife or miller, but instead is acted upon from outside by mechanical shocks, which are intended to knock the welding residues loose from the gas nozzle. With these provisions, however, it has been demonstrated in practice that adequate, fast cleaning of the gas nozzle of a welding torch cannot be attained.

By comparison, the object of the present invention is to refine a device having the characteristics recited at the outset in such a way that complete moistening of the gas nozzle with anti-stick medium or similar fluid is made possible, and precise metering as well as low consumption of anti-stick medium or similar fluid is assured. Moreover, the device should be simple in construction, and in a further coordinate aspect of the invention, it should also be suited for cutting the welding wire, located in the gas nozzle to be cleaned, to length in such a way that the spherical or rounded thickened places that are present as a rule on the end of the welding wire are removed.

With a device of the type defined at the outset, the primary object of the present invention is essentially attained in that the spraying device is movable relative to the clamping/holding device in the direction of a second axis located differently from the first axis. Because of these provisions, it is attained that after the completion of the activity of the cleaning device for mechanically removing welding residues from the gas nozzle, and after the cleaning device is moved out of the gas nozzle, the spraying device is moved in a direction different from the direction of movement of the cleaning device, essentially transversely to a longitudinal axis of the gas nozzle or of the clamping/holding device, and then the stream of fluid emerging from the spraying device, during the motion of the spraying device, moistens the gas nozzle completely, and in particular its inner surfaces, as well as the welding wire located there. By means of suitable control of the timing of the fluid stream or mist emerging from the spraying device, it can be assured that practically all the fluid emerging from the spraying device reaches the gas nozzle, or its interior, thus assuring low consumption of anti-stick medium.

In a first advantageous feature of the invention, it is provided that the clamping/holding device has one or more clamping/holding jaws for gripping or holding the gas nozzle, and the gas nozzle is centered relative to the first axis. Preferably, the welding torch or gas nozzle is clamped or held in the vertical direction in the device of the invention, and the gas nozzle points in the direction of the cleaning device located below it, so that the cleaning device can be moved simply and in a centered way into the gas nozzle and out of it.

The cleaning device has a rotating knife or a rotating miller, whose axis of rotation is essentially aligned with the first axis. Because of this provision, it is assured that the welding residues are removed entirely from the gas nozzle, and damage to the knife or miller or to the gas nozzle is averted. It is understood that the dimensions of the knife or miller are adapted to the particular gas nozzle to be cleaned.

Preferably, the knife or the miller is driven by a drive, for instance an electric motor drive but in particular an air motor drive.

Moreover, it proves advantageous that the rotary speed of the miller or knife is detected and controlled/regulated by a rotary speed monitor.

Especially advantageously, the first axis and the second axis are disposed substantially transversely to one another and preferably form an angle of between 60° and approximately 150°, preferably approximately 90°. While the cleaning device is moved in the direction of the first axis, which also substantially corresponds to the gas nozzle axis, the spraying device is moved transversely to this axis, preferably perpendicular to this axis, so that complete moistening of the gas nozzle with fluid, such as anti-stick medium, is assured along with metered, low consumption of the fluid.

Preferably, the spraying device has a spray nozzle, which is movable in the direction of this second axis. This provision has the advantage that the spraying device itself, except for the spray nozzle, can be disposed for instance in stationary fashion in the cleaning device, while the movable spray nozzle is connected to the stationary spraying device, for instance via a flexible hose or the like.

In another feature of the invention, it is advantageously provided that the movable spray nozzle has a nozzle axis, which forms an angle of <60°, and preferably of 45° to 25° or less, with the first axis. The spray nozzle therefore need not be located directly below the gas nozzle but instead can be located slightly offset laterally, yet it is still assured that all the fluid emerging from the spray nozzle also gets into the gas nozzle.

In an advantageous refinement of the invention, it is provided that the device has a movable cutting device for cutting the welding wire of the gas nozzle to length. Thus during the operation of cleaning the gas nozzle, the tip of the welding wire, which is located in the gas nozzle and as a rule is rounded or thickened, can also be removed.

Preferably, the cutting device has a so-called lower knife and a so-called upper knife, and at least one of the knives, and preferably both knives, are movable. Preferably, the knives are located laterally of the first axis in the position of repose and then upon activation are moved toward the first axis, for cutting the welding wire to length.

Moreover, in another advantageous feature of the invention, it is provided that the cutting device has knife holders for holding the replaceable knives.

It is also advantageous that the cutting device or the knives or knife holders are movable substantially in the direction of the second axis.

Preferably, the cutting device is disposed between the clamping/holding device and the cleaning device. In contrast to the prior art, pivoting of the cutting device from the side, for example, or an additional relative motion of the robot arm and torch is unnecessary for aligning the wire electrode with the cutting device. The cutting device is preferably spaced apart from the clamping/holding device such that the wire electrode, after the cutting operation, should protrude relative to the tip of the flow nozzle.

In an especially advantageous, independent feature of the invention, and also independently of the other characteristics described of the device according to the invention, it is provided that the spraying device is coupled mechanically to the cutting device. On the basis of this provision, it is possible, during the actuation of the cutting device and during the procedure, for at least one of the knives of the cutting device to move in the direction of the second axis and simultaneously for the spraying device or spray nozzle of the spraying device to move in the direction of this second axis, and during the cutting of the welding wire to length, the gas nozzle can simultaneously be moistened with anti-stick medium or other fluid by activation of the spraying device. By means of this coupled motion of the spraying device and spray nozzle, a central positioning of the spray nozzle below the gas nozzle of the welding torch is attained, so that better moistening of the gas nozzle with anti-stick medium and more-precise metering as well as low consumption of anti-stick medium as assured. Also because of these provisions, after the cleaning device is moved out, the cutting device can be positioned centrally below the gas nozzle. Another advantage is that any further relative motions of a handling device, such as a robot arm, to which the welding torch is secured can be dispensed with. Even for welding torches of the kind that are not connected to a robot arm or handling device, this feature also makes for considerably simplified maintenance and cleaning of the gas nozzle.

In another feature of the invention, it is advantageously provided that a spray nozzle of the spraying device is disposed on a knife holder of the cutting device. It is understood that two spray nozzles may also be provided, one on each knife holder.

Finally, it proves advantageous that the knife or knives of the cutting device are movable or driven via a toggle lever system, as a result of which a major force boost, for transmitting cutting force to the knife or knives of the cutting device, is achieved.

Further advantages, characteristics, possible applications, and features of the present invention will become apparent from the ensuing description of an exemplary embodiment in conjunction with the drawings. All the characteristics described and/or shown in the drawings, on their own or in arbitrary useful combination, form the subject of the present invention, regardless of how they are summarized in the claims and regardless of the claims dependencies.

Figure 2:
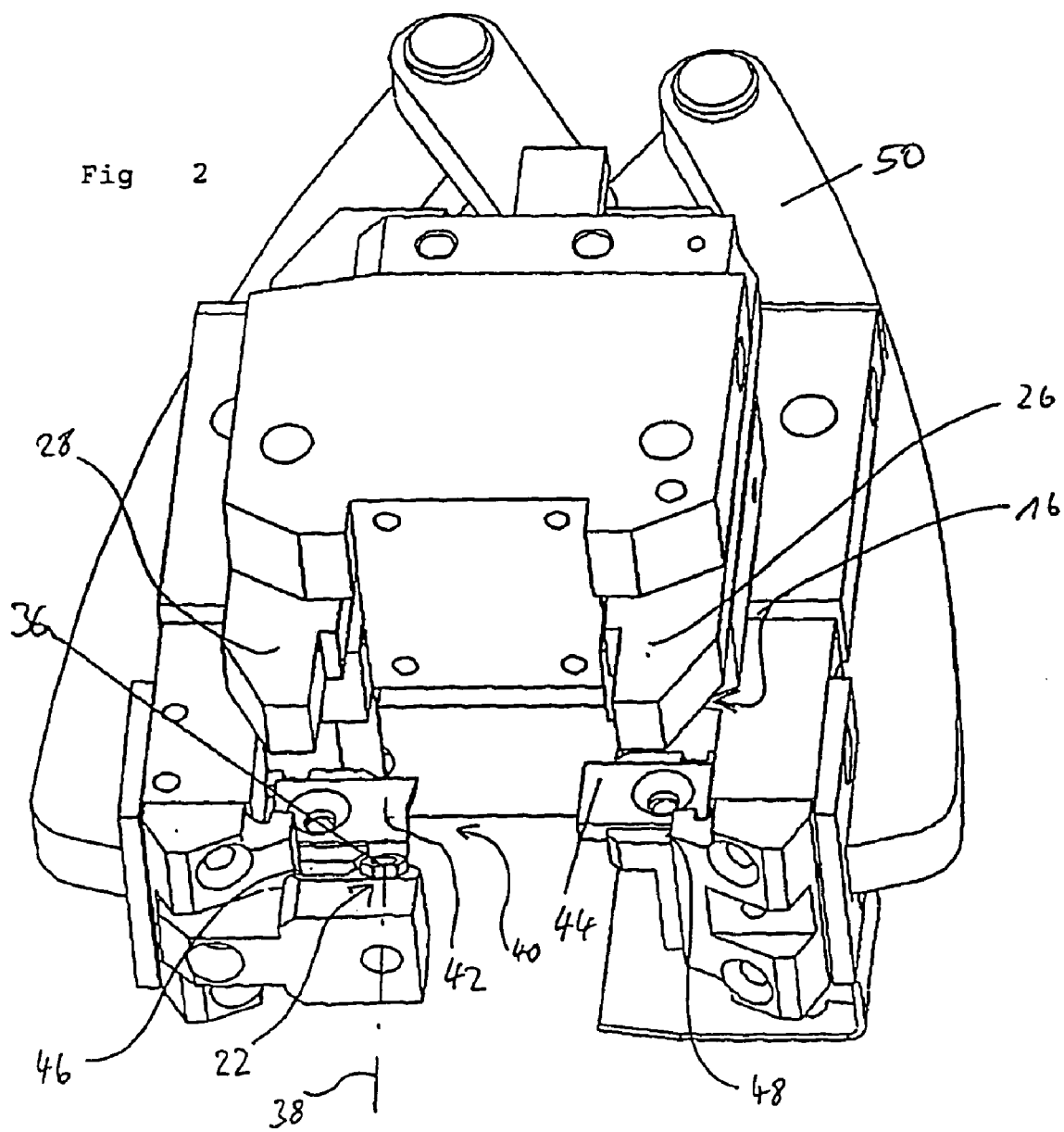

Shown are:

FIG. 1, a perspective front view of an exemplary embodiment of a device according to the invention; and FIG. 2, an enlarged detail of the clamping/holding device of the cutting device and the spraying device and their relative location to one another, shown in perspective.

The device 10 shown in the drawings serves to clean a gas nozzle 12 of a welding torch 14 and for spraying the gas nozzle 12 and a welding wire located in the gas nozzle 12.

The device 10 has a clamping/holding device 16 for the gas nozzle 12 and a cleaning device 18 for mechanically removing welding residues from the gas nozzle 12. The cleaning device 18 is movable toward and away from the clamping/holding device 16 in the direction of a first axis 20.

A spraying device 22 serves to apply an anti-stick medium or other fluid medium with which the gas nozzle 12, and/or the welding wire located in the gas nozzle 12, are uniformly moistened. The spraying device 22 is movable in the direction of a second axis 24, located differently from the first axis 20, relative to the clamping/holding device 16. As FIG. 1 shows, the first axis 20 and the second axis 24 are disposed substantially transversely to one another and preferably form an angle of between approximately 60° and approximately 150°, preferably approximately 90°.

The spraying device 22 also includes a spray nozzle 36, which is movable in the direction of this second axis 24. The movable spray nozzle 36 has a nozzle axis 38, which forms an angle of <60°, and preferably of approximately 45° to approximately 25° or less, with the first axis 20. It is understood that the nozzle axis 38 of the spray nozzle 36 may also be parallel to the first axis 20, or is aligned with it. Because of this provision, reliable, complete entry of the fluid stream emerging from the spray nozzle 36 into the gas nozzle 12 is assured.

The device 10 also has a cutting device 40 for cutting the welding wire of the gas nozzle 12 to length; this cutting device is located between the clamping/holding device 16 and a cleaning device 18. The cutting device 40 comprises a lower knife 42 and an upper knife 44, and at least one of the knives 42, 44 is movable. Preferably, both knives 42, 44, which in an outset position are located laterally of the first axis 20 and diametrically opposite one another, are movable jointly toward one another and away from one another. Moreover, the cutting device 40 has knife holders 46, 48 for holding the knives 42, 44 that are secured replaceably to them. The cutting device 40, like the spraying device 22, is movable essentially in the direction of the second axis 24.

In particular, as can be seen from the enlarged view in FIG. 2, the spraying device 22 or spray nozzle 36 is coupled mechanically to the cutting device 40. In particular, a spray nozzle 36 of the spraying device 22 is disposed on one of the knife holders 46, 48 of the cutting device 40. If the cutting device 40 or the knives 42, 44 or the knife holders 46, 48 are moved in the direction of the second axis 24 out of a position of repose into the cutting position, the spraying device 22 and spray nozzle 36 move jointly with the cutting device in the direction of the second axis 24. Simultaneously with the cutting motion of the cutting device 40, the spraying device 22 and the spray nozzle 36 are then also moved toward the gas nozzle 12, so that then, during the cutting operation or after this cutting operation by the cutting device 40, the spraying device 22 can also be activated, in order to moisten both the gas nozzle 12 and the welding wire with anti-stick medium. In terms of a procedure, cutting, or cutting to length, of the welding wire and moistening of the gas nozzle 12 with anti-stick medium or other fluid thus occur simultaneously.

The knife or knives 42, 44, or the knife holders 46, 48, of the cutting device 40 are movable or driven via a toggle lever system 50, so that provision is made for an adequate force boost.

The clamping/holding device 16 has one or more clamping/holding jaws 26, 28 for gripping the gas nozzle 12, so that the gas nozzle 12 is centered relative to the first axis 20. The cleaning device 18 has a rotating knife or a rotating miller 30, whose axis of rotation is essentially aligned with the first axis. The miller 30 or knife is set into rotation by a drive mechanism, in particular an air motor 32. The rotary speed of the miller 30 or knife is detected and controlled/regulated by a rotary speed monitor 34.

LIST OF REFERENCE NUMERALS

10 Device
12 Gas nozzle
14 Welding torch
16 Clamping/holding device
18 Cleaning device
20 First axis
22 Spraying device
24 Second axis
26 Clamping/holding jaws
28 Clamping/holding jaws
30 Miller
32 Air motor
34 Rotary speed monitor
36 Spray nozzle
38 Nozzle axis
40 Cutting device
42 Lower knife
44 Upper knife
46 Knife holder
48 Knife holder
50 Toggle lever system

The invention claimed is:

1. A device (10) for cleaning a gas nozzle (12) of a welding torch (14) and for spraying the gas nozzle (12) or a welding wire being disposed therein, having a clamping/holding device (16) for the gas nozzle (12), having a cleaning device (18) for mechanically removing welding residues from the gas nozzle (12), in which the cleaning device (18) is movable in the direction of a first axis (20) toward and away from the clamping/holding device (16), and having a spraying device (22) for applying an anti-stick medium or other fluid medium, characterized in that the spraying device (22) is movable in the direction of a second axis (24), located differently from the first axis (20), relative to the clamping/holding device (16), wherein the first axis and the second axis are disposed substantially transversely to one another.

2. The device in accordance with claim 1, characterized in that the clamping/holding device (16) has one or more clamping/holding jaws (26, 28) for gripping the gas nozzle (12), so that the gas nozzle (12) is centered relative to the first axis (20).

3. The device in accordance with claim 1, characterized in that the cleaning device (18) has a rotating knife or a rotating miller (30), whose axis of rotation is essentially aligned with the first axis.

4. The device in accordance with claim 3, characterized in that the miller (30) or knife is driven by an air motor (32).

5. The device in accordance with claim 3, characterized in that the rotary speed of the miller (30) or knife is detected and controlled/regulated by a rotary speed monitor (34).

6. The device in accordance with claim 1, characterized in that the first axis (20) and the second axis (24) form an angle of between 60° and approximately 150°.

7. The device in accordance with claim 1, characterized in that the spraying device (22) has a spray nozzle (36), which is movable in the direction of the second axis (24).

8. The device in accordance with claim 7, characterized in that the movable spray nozzle (36) has a nozzle axis (38), which forms an angle of less than 60°, with the first axis (20).

9. The device in accordance with claim 8, characterized in that the movable spray nozzle (36) has a nozzle axis (38), which forms an angle of 45° to 25° or less, with the first axis (20).

10. The device in accordance with claim 1, characterized in that the device (10) has a movable cutting device (40) for cutting the welding wire of the gas nozzle (12) to length.

11. The device in accordance with claim 10, characterized in that the cutting device (40) has a lower knife (42) and an upper knife (44), and at least one of the knives (42, 44), or both knives (42, 44), are movable.

12. The device in accordance with claim 11, characterized in that the knife or knives (42, 44) of the cutting device (40) are movable or driven via a toggle lever system (50).

13. The device in accordance with claim 10, characterized in that the cutting device (40) has knife holders (46, 48) for holding the replaceable knives (42, 44).

14. The device in accordance with claim 10, characterized in that the cutting device (40) or the knives (42, 44) are movable substantially in the direction of the second axis (24).

15. The device in accordance with claim 10, characterized in that the cutting device (40) is disposed between the clamping/holding device (16) and the cleaning device (18).

16. The device in accordance with claim 10, characterized in that the spraying device (22) is coupled mechanically to the cutting device (40).

17. The device in accordance with claim 1, characterized in that the first axis (20) and the second axis (24) form an angle of approximately 90°.

18. A device (10) for cleaning a gas nozzle (12) of a welding torch (14) and for spraying the gas nozzle (12) or a welding wire being disposed therein, having a clamping/holding device (16) for the gas nozzle (12), having a cleaning device (18) for mechanically removing welding residues from the gas nozzle (12), in which the cleaning device (18) is movable in the direction of a first axis (20) toward and away from the clamping/holding device (16), and having a spraying device (22) for applying an anti-stick medium or other fluid medium, characterized in that the spraying device (22) is movable in the direction of a second axis (24), located differently from the first axis (20), relative to the clamping/holding device (16), the first axis and the second axis are disposed substantially transversely to one another, the device (10) has a movable cutting device (40) for cutting the welding wire of the gas nozzle (12) to length, and a spray nozzle (36) of the spraying device (22) is disposed on a knife holder (46, 48) of the cutting device (40).

19. The device in accordance with claim 18, characterized in that the first axis (20) and the second axis (24) form an angle of between 60° and approximately 150°.

20. The device in accordance with claim 18, characterized in that the first axis (20) and the second axis (24) form an angle of approximately 90°.

* * * * *